United States Patent
Li et al.

(10) Patent No.: US 8,665,736 B2
(45) Date of Patent: Mar. 4, 2014

(54) MAC SLOT ALIGNMENT AMONG MULTIPLE WIRELESS STATIONS

(75) Inventors: Qinghua Li, San Ramon, CA (US);
Xintian E. Lin, Palo Alto, CA (US);
Qiang Li, Morrisville, NC (US); Jing Zhu, Portland, OR (US); Xingang Guo, Portland, OR (US); Alexey Khoryaev, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 12/394,583

(22) Filed: Feb. 27, 2009

(65) Prior Publication Data

US 2010/0220610 A1    Sep. 2, 2010

(51) Int. Cl.
*G01R 31/08* (2006.01)
(52) U.S. Cl.
USPC .......................................................... 370/252
(58) Field of Classification Search
USPC ......... 370/203, 208, 215, 252, 277, 298, 304, 370/311, 312, 324, 328, 329, 334–338, 370/342–346, 349, 350, 379, 389, 392, 370/395.62, 445, 447, 458–470, 503, 507, 370/509–520
See application file for complete search history.

(56) References Cited

U.S. PATENT DOCUMENTS

| | | | | |
|---|---|---|---|---|
| 6,771,720 | B1* | 8/2004 | Yang et al. | 375/345 |
| 6,891,792 | B1* | 5/2005 | Cimini et al. | 370/206 |
| 7,062,282 | B2* | 6/2006 | Liu et al. | 455/502 |
| 2002/0034944 | A1* | 3/2002 | Tanno et al. | 455/434 |
| 2003/0231650 | A1* | 12/2003 | Shoemake et al. | 370/464 |
| 2004/0004934 | A1* | 1/2004 | Zhu et al. | 370/208 |
| 2008/0232344 | A1* | 9/2008 | Basu et al. | 370/350 |
| 2008/0316978 | A1* | 12/2008 | Ronen et al. | 370/336 |
| 2010/0046492 | A1* | 2/2010 | Abraham et al. | 370/342 |

* cited by examiner

*Primary Examiner* — Jung-Jen Liu
(74) *Attorney, Agent, or Firm* — Forefront IP Lawgroup, PLLC

(57) ABSTRACT

A device in a wireless network receives signals and determines media access control (MAC) slot boundaries of the received signals. The MAC slot boundaries are averaged in time, and a local slot boundary is modified in response thereto. The local MAC slot boundary is modified by less than ten percent of a short interframe space until the local MAC slot boundary is within one orthogonal frequency division multiplexing (OFDM) cyclic prefix duration of the averaged MAC slot boundaries.

13 Claims, 6 Drawing Sheets

MAC SLOT ALIGNMENT AMONG MULTIPLE WIRELESS STATIONS

FIELD

The present invention relates generally to wireless networks, and more specifically to the timing of transmissions in wireless networks.

BACKGROUND

Wireless networks typically include multiple stations that communicate with each other using radio frequency (RF) signals. In situations where multiple stations transmit signals at the same time, a receiving station will attempt to receive a signal from one station, and reject the signal from the other station. One of the transmitting stations is considered an "interfering station", and the signal transmitted by the interfering station is considered an "interfering signal". The other transmitting station is transmitting a "desired signal". The receiving station tries to receive the desired signal while rejecting the interfering signal. If the transmitting stations transmit signals on the same wireless channel, the interference is commonly referred to as "co-channel interference" (CCI).

Desired and interfering signals are referred to as "asynchronous" when they are not aligned within a certain time tolerance. Co-channel interference caused by asynchronous signals is typically treated as additive white noise when trying to reject the interfering signals. Known methods exist to reduce CCI by treating the interfering signals as other than additive white noise, however these methods typically require that the desired and interfering signals are aligned within a particular tolerance.

Accordingly, a need exists to time-align wireless transmissions within a particular tolerance.

DESCRIPTION OF EMBODIMENTS

Figure 1:
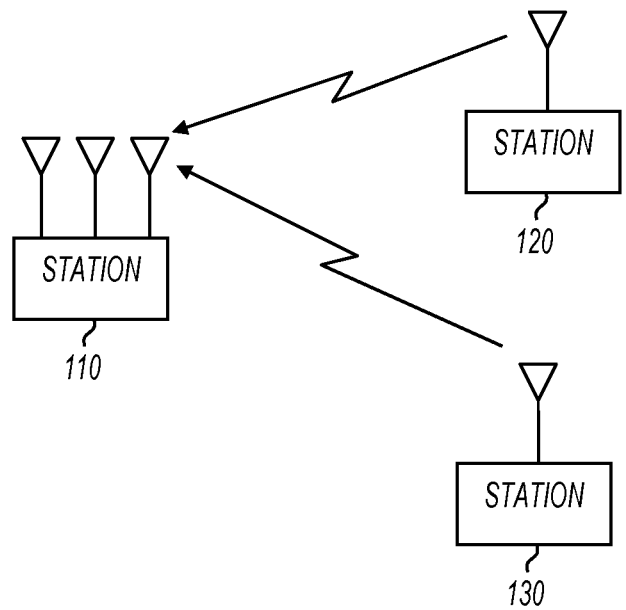
FIG. 1 shows stations in a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows stations in a wireless network. In some embodiments, stations 110, 120, and 130 are part of a wireless local area network (WLAN). For example, one or more of stations 110, 120, and 130 may be an access point in a WLAN. Also for example, one or more of stations 110, 120, and 130 may be a mobile station such as a laptop computer, personal digital assistant (PDA), or the like. Further, in some embodiments, stations 110, 120, and 130 are part of a wireless wide area network (WWAN) or wireless metropolitan area network (WMAN). For example, one or more of stations 110, 120, and 130 may be a base station or a subscriber unit. Although only three stations are shown in FIG. 1, any number of stations may be present without departing from the scope of the present invention.

In some embodiments, stations 110, 120, and 130 may operate partially in compliance with, or completely in compliance with, a wireless network standard. For example, stations 110, 120, and 130 may operate partially in compliance with a WLAN standard such as IEEE Std. 802.11, 1999 Edition, although this is not a limitation of the present invention. As used herein, the term "802.11" refers to any IEEE 802.11 standard, including, but not limited to, the 1999 edition. Also for example, stations 110, 120, and 130 may operate partially in compliance with a WMAN standard such as IEEE Std. 802.16-2004, although this is not a limitation of the present invention. As used herein, the term "802.16" refers to any IEEE 802.16 standard, including, but not limited to, the 2004 edition. Also for example, stations 110, 120, and 130 may operate partially in compliance with any other standard, such as any IEEE personal area network standard or wide area network standard.

Stations 110, 120, and 130 may include any number of antennas. In the example of FIG. 1, station 110 includes three antennas, and each of stations 120 and 130 includes one antenna. The "channel" through which the stations communicate may include many possible signal paths. For example, when stations 110, 120, and 130 are in an environment with many "reflectors" (e.g. walls, doors, or other obstructions), many signals may arrive from different paths. This condition is known as "multipath." In some embodiments, stations 110, 120, and 130 utilize multiple antennas to take advantage of the multipath and to increase the communications bandwidth. Further, the multipath may be advantageously used to reject interfering signals.

In some embodiments, stations 110, 120, and 130 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

Stations 120 and 130 are shown transmitting, and station 110 is shown receiving. In situations where both stations 120 and 130 transmit signals at the same time, station 110 will attempt to receive a signal from one station, and reject the signal from the other station. For example, station 130 may transmit a signal that interferes with a desired signal that is transmitted by station 120. In this case, station 130 is an interfering station, and the signal transmitted by station 130 is considered an interfering signal.

In IEEE 802.11 medium access control (MAC), the timing for MAC slots is synchronized to the last heard frame over the air. Each device starts transmission at the MAC slot boundary. For example, and not by way of limitation, the slot duration is 9 us for 802.11a. The MAC slots among devices aren't always able to synchronize well because some devices in the hidden nodes may not be able to hear all the transmissions. This can happen especially in mesh networks with many stations. Depending on the number of stations and their relative locations, the MAC slot boundary among the stations can be quite different.

In some embodiments, one or more of stations 110, 120, and 130 modifies a local MAC slot boundary to time-align transmissions within a particular tolerance. For example, station 120 may modify a local MAC slot boundary such that signals transmitted by both stations 120 and 130 can be considered synchronous when received at station 110. As described further below, when each station modifies its own local MAC slot boundary based on its nearest neighbors' MAC slot boundaries, asynchronous communications can be made synchronous to within a particular tolerance.

Figure 2:
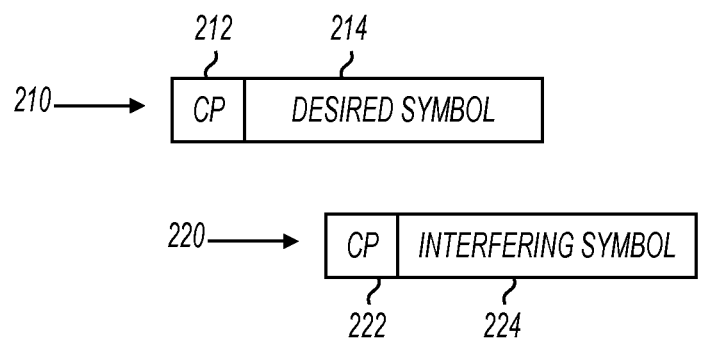
FIG. 2 shows asynchronous co-channel interference in a wireless network.

FIG. 2 shows asynchronous co-channel interference in a wireless network. The signals shown in FIG. 2 may be transmitted by two stations such as stations 120 and 130 (FIG. 1). Signal 210 is transmitted by station 120 and signal 220 is transmitted by station 130. In this example, signal 210 is the desired signal and signal 220 is the interfering signal. Signals 210 and 220 are examples of orthogonal frequency division multiplexing (OFDM) signals having cyclic prefixes (CP) followed by symbols. Signals 210 and 220 are examples of asynchronous interference. Signal 210 is first received at station 110 when the cyclic prefix 212 arrives. After the cyclic prefix 212 arrives, the desired symbol 214 arrives. During the reception of desired symbol 214, cyclic prefix 222 and interfering symbol 224 arrive at station 110 as asynchronous interference. Station 110 will typically treat signal 220 as white noise; a suboptimal solution to rejecting the interfering signal.

Figure 3:
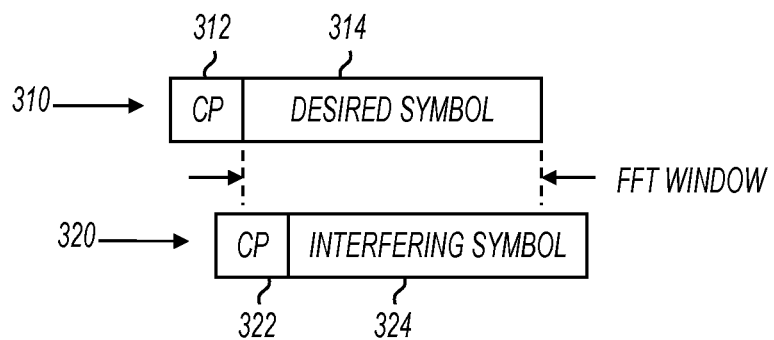
FIG. 3 shows synchronous co-channel interference in a wireless network.

FIG. 3 shows synchronous co-channel interference in a wireless network. For the purposes of this description, the interference is considered synchronous when the interfering and desired signals are synchronized so that the symbol boundaries are within the CP. The implementation complexity of co-channel interference mitigation is much lower for synchronous networks than for asynchronous networks. The CCI mitigation can be done in a symbol by symbol and subcarrier by subcarrier fashion for synchronous OFDM networks, while buffers and sequence equalization may be needed for asynchronous case. For synchronous networks, the receiver can take one symbol period of samples for a Fast Fourier Transform (FFT) as shown in FIG. 3, which contains complete FFT periods for both the desired and the interfering OFDM symbols. It should be noted that there may exist intersymbol interference in the FFT sample period; however, the power of the intersymbol interference from the adjacent interfering (or desired) symbols is much smaller than that of the current interfering symbol and thus can be ignored (because of the short propagation delay in high density environment).

Figure 4:
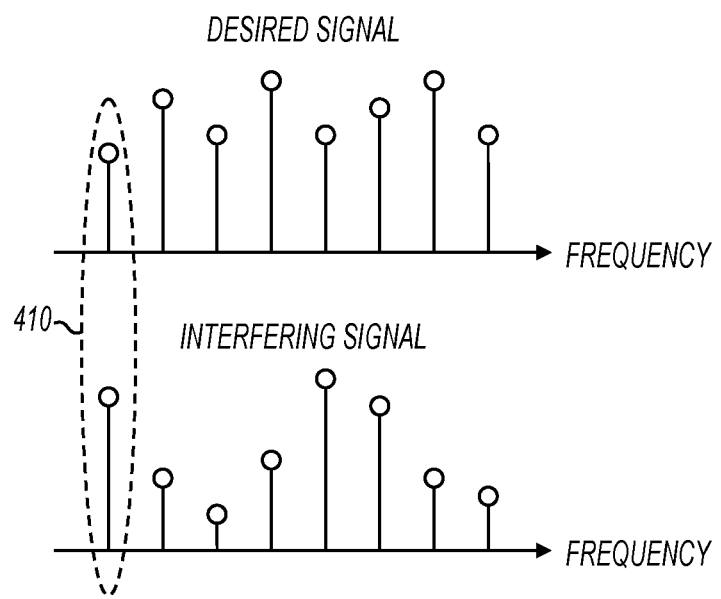
FIG. 4 shows subcarriers of a desired signal and an interfering signal.

After the FFT, one Quadrature Amplitude Modulation (QAM) symbol from the desired signal and one QAM symbol from the interfering signal are superimposed on each subcarrier as shown at 410 in FIG. 4. The interference can be removed subcarrier by subcarrier using simple techniques such as zero-forcing or minimum mean squared error (MMSE), or high-performance techniques such as successive interference cancellation (SIC) that detects the interfering QAM symbol and removes it per subcarrier. SIC with rate adaptation can achieve a higher throughput than that of zero-forcing and MMSE. SIC is not feasible for asynchronous networks due to the high complexity of sequence equalization. In addition, the detection of interference's arrival is easier for the synchronous case than for the asynchronous case because coarse timing is established and fewer computations such as auto/cross correlations are needed to detect the interfering short preamble. Furthermore, the interference statistics such as covariance matrix is easier to be computed in synchronous case than in asynchronous case.

Various embodiments of the present invention modify MAC slot boundaries within stations to allow transmissions to be considered synchronous. For example, in the examples of FIGS. 2 and 3, the MAC slot boundary in station 120 may be modified to change signal 210 to become signal 310, and the MAC slot boundary in station 130 may be modified to change signal 220 to become signal 320. Slot boundaries of neighboring stations may be detected and averaged over a period of time and/or a neighborhood of devices. In other embodiments of the present invention, timing error is reduced by modifying clock signals within each station. Because clock errors are independent among different stations, the errors can be reduced by averaging over the clocks.

Slot Boundary and Clock Corrections

Figure 5:
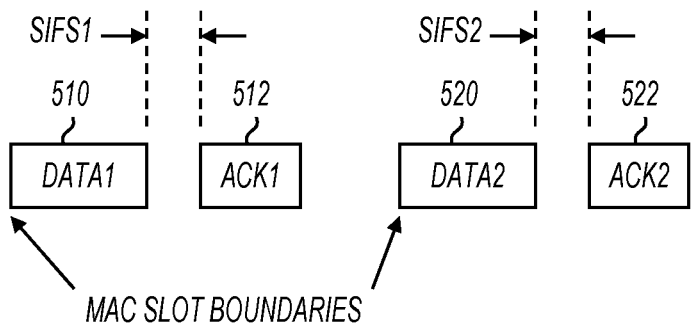
FIG. 5 shows frames aligned with media access control (MAC) slot boundaries.

Each station collects MAC slot boundaries of its neighbor stations, whose propagation time can be ignored as shown in FIG. 5. The neighbor stations can be identified by received signal power level. The MAC slot boundary can be obtained from the beginning time instant of various frames such as poll frame, data frame, and beacon frame. The beginning time instant is obtained during the preamble detection. Example data frames from neighboring devices are shown at 510 and 520. Example acknowledgement frames are shown at 512 and 522.

Figure 6:
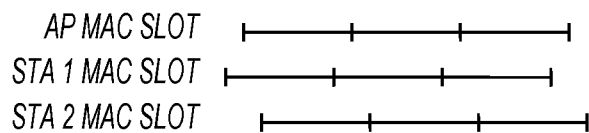
FIG. 6 shows MAC slots and boundaries for three wireless stations.
Figure 7:
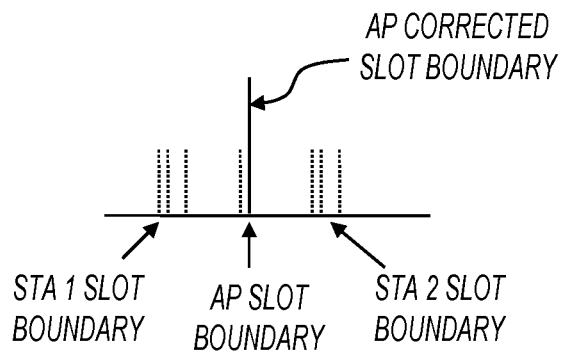
FIG. 7 shows a corrected MAC slot boundary.

The detected MAC slot boundaries over a period of time are compared to that of the local MAC slot boundary of the local station. This is illustrated in FIG. 6, where the access point (AP) is the local station detecting the MAC slot boundaries of STA1 and STA2. The local station places each detected boundary with respect to its local boundary as shown in FIG. 7. The averaged boundary over the period and the neighbor devices is used to update the local boundary. As long as the correction amount of the MAC slot boundary per time is within the 10% of the short interframe space (SIFS) duration, the correction complies with the current 802.11 MAC standard. In FIG. 7, the local station (an AP in this example) shifts its boundary backward. Namely, the local station uses a MAC slot boundary slightly later than the original for the subsequent frames. The time window for the averaging shouldn't be too long such that a belated MAC slot boundary is misinterpreted as a early one with respect to the local boundary.

In some embodiments, MAC slot boundaries are modified as follows.

Time has to be slotted with one OFDM symbol (4 us). A station should only transmit at a time instant given by "$t_0 + nd$", where $t_0$ is the starting time, and d is one OFDM symbol.

For any two stations with $t_0(A)$ and $t_0(B)$, the two stations can be considered synchronous if $\mod(|t_0(A) - t_0(B)|, d) < \Delta$, where $\Delta$ is the synchronization requirement, depending on the length of the cyclic prefix. For an entire network to be considered synchronous, max, $$\max_{i,j} \mod(|t_0(i) - t_0(j)|, d) < \Delta,$$

where i and j indicate any two nodes (stations) in the network.

In some embodiments, e.g., in ad-hoc networks, each station listens to the air and adjusts its own "$t_0$" to sync up with other stations. As an example, assume that a station detects 3 values $t_0(1)$, $t_0(2)$, $t_0(3)$, from three neighbor stations, and its own value is $t_0(0)$. Notice that all the $t_0$ values are mod-ed by "d" so that they will be always less than "d". A device should always choose the value to maximize the number of link pairs to meet the criteria "$\mod(|t_0(A) - t_0(B)|, d) < \Delta$".

In some embodiments, e.g., in infrastructure networks, network synchronization may be achieved without every station performing the calculations above. In these embodiments, all mobile stations talk to an AP and the AP frame occupies at least every other frame. Accordingly, in some embodiments, only the APs perform the actions listed above to synchronize each other and the mobile stations synchronize to its AP by synchronizing to the last frame on the air.

In addition to shifting the MAC slot boundary as described above, clock error may be reduced to stabilize the MAC slot boundary synchronization. In current 802.11 compliant systems, the clock is specified to be accurate to 40 parts per million (ppm). The various embodiments of the present invention may be utilized with the 40 ppm 802.11 clock or with a clock signal from any other type of network. The received short preamble (with channel distortion) of 802.11a/g is periodic with 10 cycles. The period durations detected from the preambles over the air may be used to correct the local clock error. After preamble detection and fine frequency/phase synchronization, samples of the short preambles of the received frame are stored and the period duration is estimated from them, where the period is determined by the transmitter's clock. The estimated period durations have independent clock errors from multiple devices. The average of the durations (including the local device's) may then be computed. The averaged duration is used to correct the local clock error. For example, if the averaged duration is longer than the local duration, then the local clock runs too fast and should be slowed down. Furthermore, the short interframe spacing (SIFS) generated by the neighbor devices can be collected as shown in FIG. 5. The averaged SIFS should be close to the SIFS specified by the standard, e.g. 16 us for 802.11a. If the averaged SIFS is longer than the SFIS counted by the local clock, then the local clock runs too fast and should be corrected. Otherwise, the local clock runs too slow.

Figure 8:
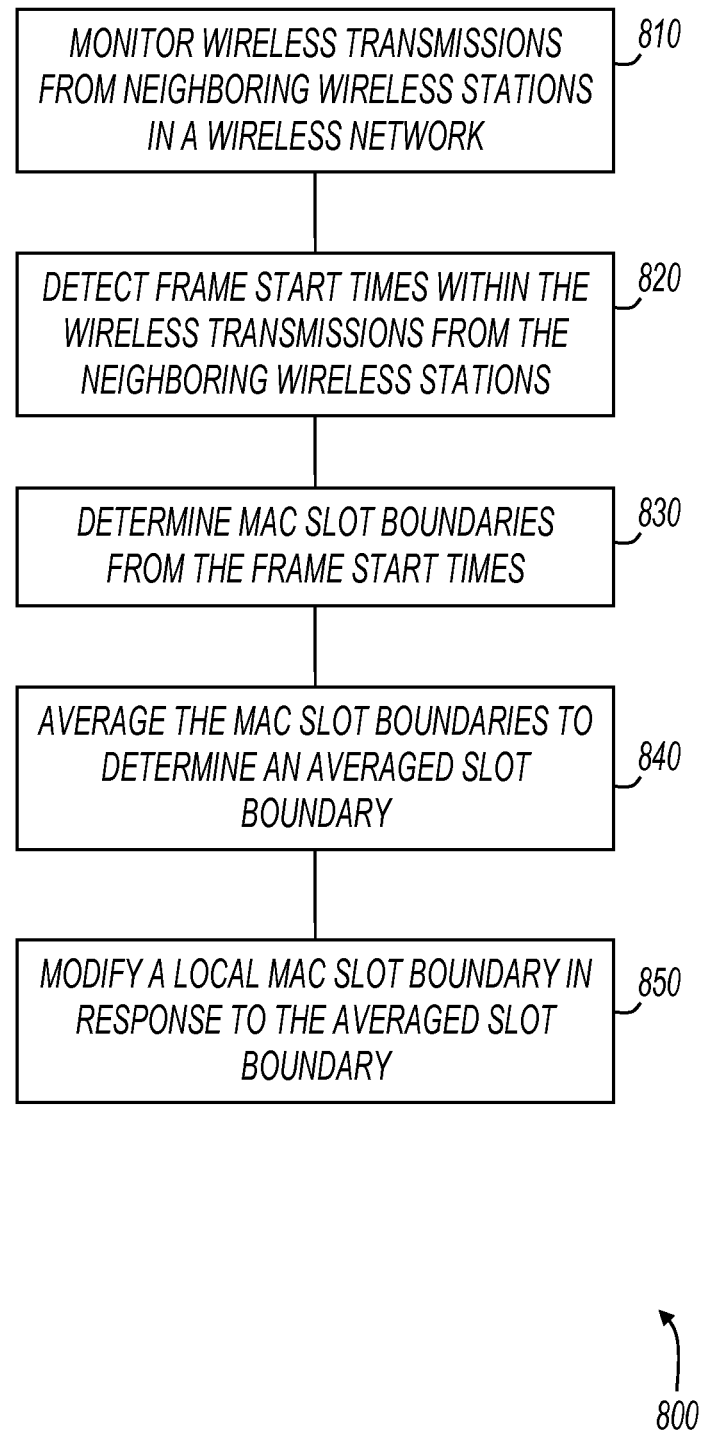
FIGS. 8 and 9 show flowcharts in accordance with various embodiments of the present invention.

FIG. 8 shows a flowchart in accordance with various embodiments of the present invention. In some embodiments, method 800 may be used in, or for, a wireless system that utilizes MAC slot boundaries. In some embodiments, method 800, or portions thereof, is performed by a wireless communications device, embodiments of which are shown in the various figures. In other embodiments, method 800 is performed by a processor or electronic system. Method 800 is not limited by the particular type of apparatus or software element performing the method. The various actions in method 800 may be performed in the order presented, or may be performed in a different order. Further, in some embodiments, some actions listed in FIG. 8 are omitted from method 800.

Method 800 is shown beginning at block 810 in which wireless transmissions from neighboring wireless stations in a wireless network are monitored. At 820, frame start times within the wireless transmissions are detected. At 830, MAC slot boundaries are determined from the frame start times. FIG. 5 shows frame start times within wireless transmissions. FIG. 6 shows MAC slots and boundaries of various stations in the wireless network.

At 840, the MAC slot boundaries are averaged to determine an average slot boundary, and at 850, a local MAC slot boundary is modified in response to the averaged slot boundary. FIG. 7 shows MAC slot boundaries of various stations. FIG. 7 also shows a corrected slot boundary for an access point. Slot boundaries may be averaged over various neighboring stations, or over time, or both.

Figure 9:
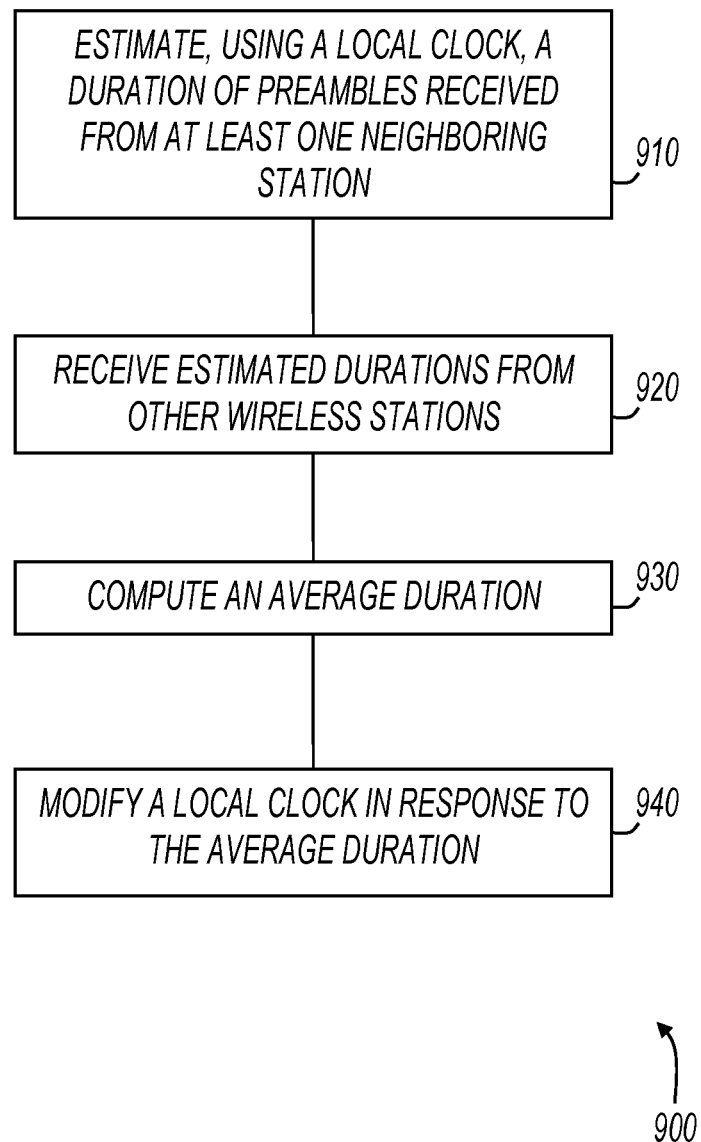

FIG. 9 shows a flowchart in accordance with various embodiments of the present invention. In some embodiments, method 900 may be used in, or for, a wireless system that utilizes MAC slot boundaries. In some embodiments, method 900, or portions thereof, is performed by a wireless communications device, embodiments of which are shown in the various figures. In other embodiments, method 900 is performed by a processor or electronic system. Method 900 is not limited by the particular type of apparatus or software element performing the method. The various actions in method 900 may be performed in the order presented, or may be performed in a different order. Further, in some embodiments, some actions listed in FIG. 9 are omitted from method 900.

Method 900 is shown beginning at block 910 in which a local clock is used to estimate a duration of preambles received from at least one neighboring wireless station in a wireless network. At 920, estimated durations are received from other wireless stations. At 930, an average duration is computed, and at 940, a local clock is modified in response to the average duration.

Modifying a local clock in this manner may be useful to synchronize transmissions within a wireless network. In some embodiments, the actions of method 900 are combined with the actions of method 800 (FIG. 8) such that both a local clock and a local MAC slot boundary are modified in response to clocks and slot boundaries of neighboring stations.

Figure 10:
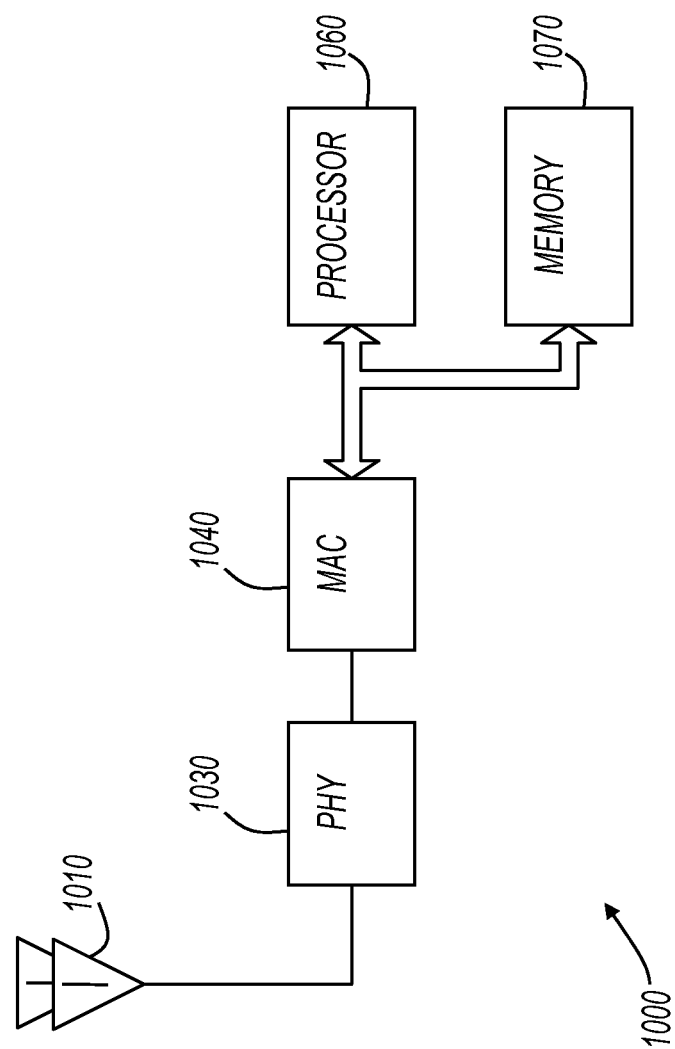
FIG. 10 shows an electronic system in accordance with various embodiments of the present invention.

FIG. 10 shows a system diagram in accordance with various embodiments of the present invention. Electronic system 1000 includes antennas 1010, physical is layer (PHY) 1030, media access control (MAC) layer 1040, processor 1060, and memory 1070. In some embodiments, electronic system 1000 may be a station capable of modifying MAC slot boundaries as described above with reference to the previous figures. In other embodiments, electronic system 1000 may be a station that modifies a local clock. For example, electronic system 1000 may be utilized in a wireless network as station 110, 120, or 130 (FIG. 1). Also for example, electronic system 1000 may be a station capable of performing the calculations shown in any of the equations above.

In some embodiments, electronic system 1000 may represent a system that includes an access point, a mobile station, a base station, or a subscriber unit as well as other circuits. For example, in some embodiments, electronic system 1000 may be a computer, such as a personal computer, a workstation, or the like, that includes an access point or mobile station as a peripheral or as an integrated unit. Further, electronic system 1000 may include a series of access points that are coupled together in a network.

In operation, system 1000 sends and receives signals using antennas 1010, and the signals are processed by the various elements shown in FIG. 10. In some embodiments, antennas 1010 may be an antenna array or any type of antenna structure that supports MIMO processing. In other embodiments, antennas 1010 may include a single antenna. System 1000 may operate in partial compliance with, or in complete compliance with, a wireless network standard such as an 802.11 standard.

Physical layer (PHY) 1030 is coupled to antennas 1010 to interact with a wireless network. PHY 1030 may include circuitry to support the transmission and reception of radio frequency (RF) signals. For example, in some embodiments, PHY 1030 includes an RF receiver to receive signals and perform "front end" processing such as low noise amplification (LNA), filtering, frequency conversion or the like. Further, in some embodiments, PHY 1030 includes transform mechanisms and beamforming circuitry to support MIMO signal processing. Also for example, in some embodiments, PHY 1030 includes circuits to support frequency up-conversion, and an RF transmitter. Further, PHY 1030 may include circuitry to modify a local clock signal.

Media access control (MAC) layer 1040 may be any suitable media access control layer implementation. For example, MAC 1040 may be implemented in software, or hardware or any combination thereof. In some embodiments, a portion of MAC 1040 may be implemented in hardware, and a portion may be implemented in software that is executed by processor 1060. Further, MAC 1040 may include a processor separate from processor 1060. MAC 1040 includes circuitry and/or software to modify a local MAC slot boundary as described above.

In operation, processor 1060 reads instructions and data from memory 1070 and performs actions in response thereto. For example, processor 1060 may access instructions from memory 1070 and perform method embodiments of the present invention, such as method 800 (FIG. 8) or method 900 (FIG. 9) or methods described with reference to other figures. Processor 1060 represents any type of processor, including but not limited to, a microprocessor, a digital signal processor, a microcontroller, or the like.

Memory 1070 represents an article that includes a machine readable medium. For example, memory 1070 represents a random access memory (RAM), dynamic random access memory (DRAM), static random access memory (SRAM), read only memory (ROM), flash memory, or any other type of article that includes a medium readable by processor 1060. Memory 1070 may store instructions for performing the execution of the various method embodiments of the present invention.

Although the various elements of system 1000 are shown separate in FIG. 10, embodiments exist that combine the circuitry of processor 1060, memory 1070, and MAC 1040 in a single integrated circuit. For example, memory 1070 may be an internal memory within processor 1060 or may be a microprogram control store within processor 1060. In some embodiments, the various elements of system 1000 may be separately packaged and mounted on a common circuit board. In other embodiments, the various elements are separate integrated circuit dice packaged together, such as in a multi-chip module, and in still further embodiments, various elements are on the same integrated circuit die.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
    monitoring wireless transmissions from neighboring wireless stations in a wireless network;
    detecting frame start times within the wireless transmissions from the neighboring wireless stations;
    determining media access control (MAC) slot boundaries from the frame start times, the determined MAC slot boundaries are averaged to provide an average MAC slot boundary; and
    modifying a local MAC slot boundary in response to determined MAC slot boundaries, wherein the modifying a local MAC slot boundary includes modification of the local MAC slot boundary to within one orthogonal frequency division multiplexing (OFDM) cyclic prefix duration of the average MAC slot boundary;
    estimating, using a local clock, a duration of preambles received from the neighboring wireless stations;
    receiving estimated durations from the neighboring wireless stations;
    computing an average duration; and
    modifying a local clock in response to the average duration.

2. The method of claim 1 wherein the local MAC slot boundary includes the MAC slot boundary of an access point (AP).

3. The method of claim 1 wherein averaging MAC slot boundaries comprises averaging together MAC slot boundaries of multiple neighboring wireless stations.

4. The method of claim 1 wherein averaging MAC slot boundaries comprises averaging together MAC slot boundaries of one neighboring wireless station over time.

5. The method of claim 1 wherein modifying a local MAC slot boundary comprises modifying the local MAC slot boundary by less than 10% of a short interframe space (SIFS).

6. The method of claim 1 wherein modifying a local MAC slot boundary comprises repeatedly modifying the local MAC slot boundary by less than 10% of a short interframe space (SIFS) until the local MAC slot boundary is within one orthogonal frequency division multiplexing (OFDM) cyclic prefix duration of the determined slot boundary.

7. A non-transitory computer-readable medium having instructions stored thereon that when executed by a computer result in the computer performing:
    detecting transmissions from at least one neighboring station in a wireless network;
    determining a medium access control (MAC) slot boundary of the at least one neighboring station;
    synchronizing local transmissions to within one orthogonal frequency division multiplexing (OFDM) cyclic prefix duration of the MAC slot boundary of the at least one neighboring station;
    averaging MAC slot boundaries from multiple neighboring stations, wherein an averaged slot boundary is used for a local MAC slot boundary;
    estimating, using a local clock, a duration of preambles received from the at least one neighboring station;
    receiving estimated durations from other wireless stations;
    computing an average duration; and
    modifying a local clock in response to the average duration.

8. The computer-readable medium of claim 7 wherein the instructions when accessed further result in the computer performing averaging slot boundaries from one neighboring station over time.

9. The computer-readable medium of claim 7 wherein synchronizing comprises modifying a local MAC slot boundary to within one OFDM cyclic prefix duration of the at least one neighboring station.

10. The computer-readable medium of claim 9 wherein modifying a local MAC slot boundary comprises modifying the local MAC slot boundary by less than 10% of a short interframe space (SIFS).

11. A wireless communications apparatus comprising:
an orthogonal frequency division multiplexing (OFDM) transceiver; and
a medium access control (MAC) layer operable to average slot boundaries from at least one other wireless communication apparatus, and to modify a local slot boundary in response thereto, wherein the modification of as the local slot boundary is within one OFDM cylic prefix duration of the average of the slot boundaries;
wherein the modification of the local slot boundary to within one OFDM cyclic prefix duration is combined with modification of a local clock based on average duration of the at least one neighboring station.

12. The wireless communications apparatus of claim 11 wherein the MAC layer is operable to modify the local slot boundary by less than 10% of a short interframe space (SIFS).

13. The wireless communications apparatus of claim 11 wherein the MAC layer is operable to repeatedly modify the local slot boundary by less than 10% of a short interframe space (SIFS) until the local slot boundary is within one OFDM cyclic prefix duration of the at least one other wireless communications apparatus.

\* \* \* \* \*

UNITED STATES PATENT AND TRADEMARK OFFICE
CERTIFICATE OF CORRECTION

| | | |
|---|---|---|
| PATENT NO. | : 8,665,736 B2 | Page 1 of 1 |
| APPLICATION NO. | : 12/394583 | |
| DATED | : March 4, 2014 | |
| INVENTOR(S) | : Li et al. | |

It is certified that error appears in the above-identified patent and that said Letters Patent is hereby corrected as shown below:

In the Claims

Column 10, line 1, In Claim 11, after "of" delete "as".

Signed and Sealed this
Twenty-fourth Day of June, 2014

Michelle K. Lee
*Deputy Director of the United States Patent and Trademark Office*